Patented Dec. 13, 1938

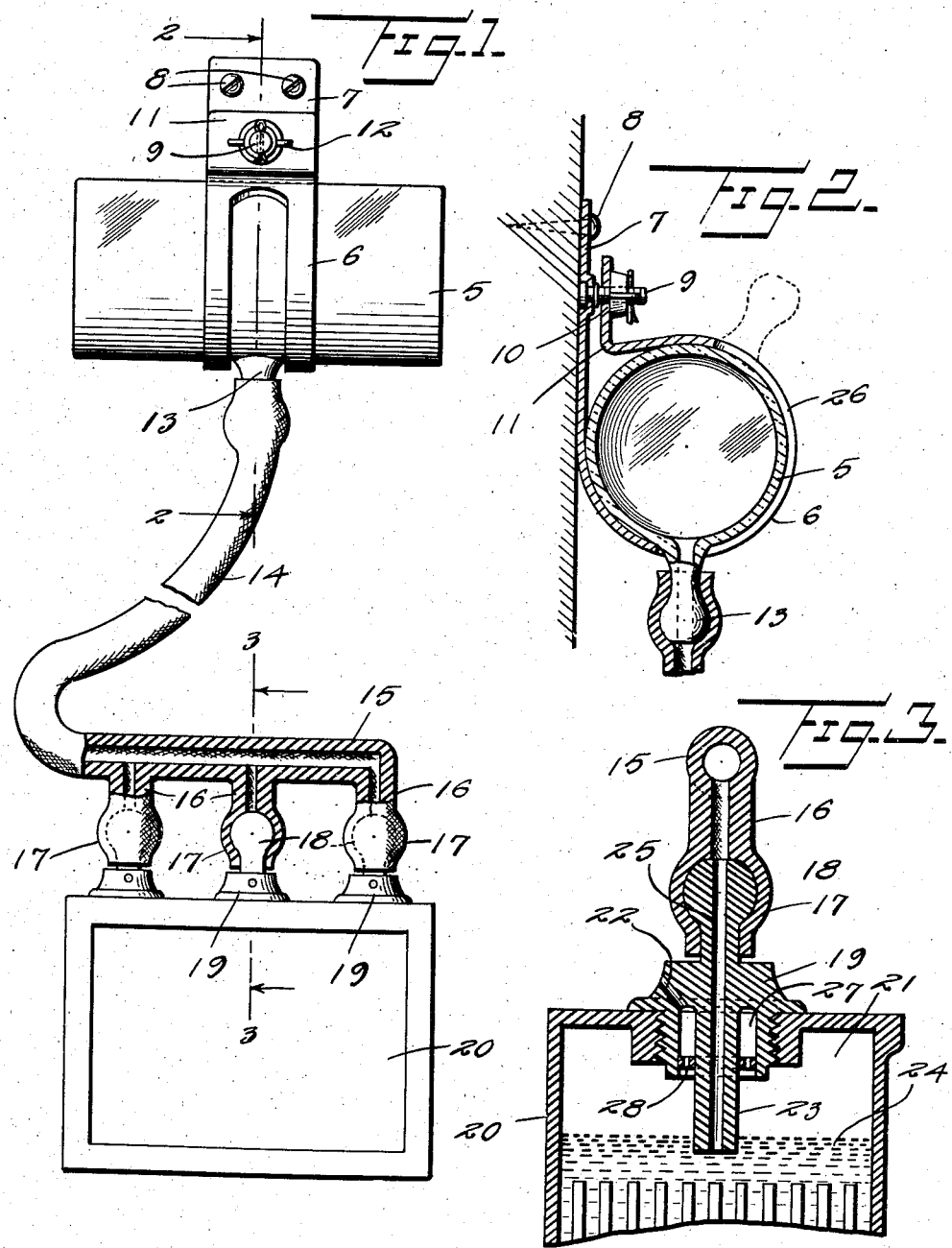

2,140,432

UNITED STATES PATENT OFFICE 2,140,432

STORAGE BATTERY WATER SUPPLY FOUNTAIN

Frank K. Nomiya Berkeley, Calif.

Application December 5, 1936, Serial No. 114,461

2 Claims. (Cl. 137—21)

The invention relates to a distilled water supply device and more especially to a storage battery water supply fountain.

The primary object of the invention is the provision of a device of this character, wherein distilled water within a container can be dispensed into the cells of a storage battery so that the distilled water will be supplied thereto when necessary, thereby avoiding the necessity of frequent inspection of the condition of the cell for determining a low level therein as the supply will be automatically had when the normal level of the contents of the cells of the battery become lowered.

Another object of the invention is the provision of a device of this character, wherein the cells of a battery of the storage type will be automatically replenished with liquid to replace the losses occuring through evaporation or other causes and thus maintaining maximum life to the said battery, the device being of novel construction and eliminates frequent attention to the battery when in use.

A further object of the invention is the provision of a device of this character, which is simple in construction, thoroughly reliable and effective in operation, assuring a constant supply of distilled water to the cells of a storage battery to avoid deterioration of the latter, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation partly in section of the device constructed in accordance with the invention and connected with a storage battery.

Figure 2 is a sectional view on the line 2—2 of Figure 1 looking in the direction of the arrows.

Figure 3 is an enlarged fragmentary sectional view on the line 3—3 of Figure 1 looking in the direction of the arrows.

Similar reference characters indicate corresponding parts throughout the several views in the drawing.

Referring to the drawing in detail, the device comprises a cylindrical receptacle 5 adapted for containing distilled water to be supplied to a storage battery and this receptacle is held in a split ring-like clamping bracket 6 made from a metal strap having a flat terminal ear 7 for the hanging of the said bracket by a screw or other fastener 8 upon a vertical support. The ear has fitted therein a bolt 9 to be accommodated within a hole 10 provided within another terminal ear 11 of the said bracket. The bolt 9 has threaded thereon a winged nut 12 so that when tightened the ears 7 and 11 will be brought together or moved or the ear 11 moved toward the ear 7 for the clamping of the receptacle 5 in the ring portion of said bracket 6.

The receptacle 5 is formed with a nipple 13 projected therefrom and on this nipple is coupled a flexible hose 14 provided with a distributing end or head 15. This end or head 15 is formed with branches 16 effecting nipple engaging terminals 17, these being coupled with inlet nipples 18 rising from capping plugs 19 for the filling holes or openings of the cells of an electric storage battery 20, a cell therein being indicated at 21 and is of the usual well known construction. Each cap plug is formed with an air vent 22 at one side of a central nozzle 23 upon said cap, the nozzle depending into the cell 21 and is of a length to have its free ends submerged in the liquid 24 within this cell when the said liquid is at a normal filling level within the cell. The passage 25 in the nipple 18 is continued through the nozzle 23. Thus the contents of the receptacle 5 when its nipple 13 is in a lowered position will be fed through the hose 14, end or head 15 and the branches 16 into the respective cells 21 when the liquid level has dropped below normal therein so as to bring the liquid to the normal level. In this manner the said cells of the battery 20 will be automatically fed with distilled water for maintaining the normal level thereof within the said cells. The normal level of the liquid within the cells 21 seals each nozzle 23 and thus avoids the supply of liquid in the receptacle 5 to these cells of said battery under such conditions. However, when the level of the liquid drops or recedes from the end of each nozzle 23 liquid will be supplied from the receptacle 5 into the cell to reestablish the normal level of such liquid therein.

The bracket 6 is formed with an elongated slot 26 into which extends the nipple 13 and such slot allows the nipple 16 to be moved from lowermost position to an uppermost position, that is to say, from the full line position to the dotted line position in Figure 2 of the drawing on the loosening of the bracket 6 about the receptacle for the rotation of the latter within the bracket. In this uppermost position the nipple 13 can be utilized as a filling spout to permit the filling of the said receptacle 5 with liquid when the occasion requires.

When the bracket 6 is firmly clamped on the receptacle 5 it will be held against turning within the said bracket and in this manner adjustably maintaining the nipple either in an upper most or lowermost position. When in the lowermost position the liquid within the receptacle 5 will flow into each cell in the battery 20 when the liquid therein has dropped or receded from the nozzle 23 and is below normal level within said cell.

It is, of course, understood that the nozzles 23 in the respective cells 21 in the battery are located at the longitudinal center of said cells so that when the battery is disposed at an incline to the vertical there will be no change in the normal water level within these cells due to the incline of the battery and thus additional water will not be delivered from the receptacle until the said water level drops within these cells from normal water level and the flow of water into the cells can only take place when the nozzles 23 become unsealed at their inner ends by the water within said cells and this occurs on the dropping of the water level therein.

The vent 22 at its inner end opens into an annular space 27 concentrically about each nozzle 23 and fixedly seated in this space is a perforated washer 28 which is held within said space, the vent being for the purpose of admitting air into each cell above the water level therein so that the flow of water from the receptacle 5 will occur when the nozzle 23 at the inner end is unsealed by the water due to the drop from normal level thereof within the cell.

What is claimed is:

1. A device of the character described comprising a cylindrical tank arranged for rotation on a horizontal axis and having an outlet nipple, and a clamp encircling said cylindrical tank for rotatably supporting the same for turning on a horizontal axis and simultaneously the raising and lowering of the nipple thereof.

2. A device of the character described comprising a cylindrical tank arranged for rotation on a horizontal axis and having a nipple, a clamp rotatably supporting said cylindrical tank for the turning thereof on the horizontal axis, and means associated with the clamp for holding the cylindrical tank when its nipple is in a raised or lowered position, the said clamp having an elongated slot for accommodating the nipple and limiting the movement of said nipple when being raised or lowered.

FRANK K. NOMIYA.